United States Patent [19]

Ryynänen

[11] Patent Number: 4,820,427

[45] Date of Patent: * Apr. 11, 1989

[54] METHOD OF SEQUENTIALLY SEPARATING A MEDIUM INTO DIFFERENT COMPONENTS

[75] Inventor: Seppo I. Ryynänen, Vaasa, Finland

[73] Assignee: Nobar Ky, Vaasa, Finland

[*] Notice: The portion of the term of this patent subsequent to Oct. 27, 2004 has been disclaimed.

[21] Appl. No.: 23,824

[22] Filed: Jul. 30, 1987

Related U.S. Application Data

[63] Continuation of Ser. No. 883,042, Jul. 11, 1986, Pat. No. 4,702,846, which is a continuation of Ser. No. 689,037, Jan. 8, 1985, abandoned, which is a continuation of Ser. No. 469,518, Feb. 24, 1983, abandoned.

[30] Foreign Application Priority Data

Jan. 21, 1983 [FI] Finland .................................. 830199

[51] Int. Cl.⁴ ...................... B01D 21/26; B01D 45/16; B04C 3/04; B04C 5/24
[52] U.S. Cl. .......................................... 210/788; 55/17; 55/343; 55/349; 55/461; 209/144; 209/211
[58] Field of Search ................ 55/343, 346, 349, 461; 209/144, 211; 210/512.1, 512.2, 512.3, 304, 787, 788

[56] References Cited

U.S. PATENT DOCUMENTS

| 535,099 | 3/1895 | Gale et al. | 55/461 X |
|---|---|---|---|
| 1,660,685 | 2/1928 | Stebbins | 209/144 |
| 1,660,687 | 2/1928 | Stebbins | 209/144 |
| 2,701,056 | 2/1955 | Morton | 209/144 |
| 3,520,114 | 7/1970 | Pall et al. | 209/144 |
| 3,948,771 | 4/1976 | Bielefeldt | 210/512.2 X |
| 4,001,121 | 1/1977 | Bielefeldt | 210/787 X |
| 4,263,027 | 4/1981 | Varnas et al. | 55/346 |
| 4,375,365 | 3/1983 | Muller et al. | 55/346 |
| 4,389,307 | 6/1983 | Boadway | 209/211 |
| 4,702,846 | 10/1987 | Ryynanen | 210/788 |

FOREIGN PATENT DOCUMENTS 1378555 10/1964 France .

Primary Examiner—W. Gary Jones
Attorney, Agent, or Firm—Weingarten, Schurgin, Gagnebin & Hayes

[57] ABSTRACT

A method and vortex separator for sequential separation of a medium into different components by means of centrifugal force in a vortex array (2, 2) in a manner that part of the vortex flow (71) proceeds from the outer portions of a vortex (2) into the outer portions of a following vortex (2) and in individual vortexes (2) particles having a major mass concentrate in the outer portions of a vortex and those having a minor mass concentrate in the central portions of a vortex. For increased separation capacity the successive vortexes (2) of a vortex array (2, 2) are backed up substantially on each other while rotating in opposite directions and the flow (71) between individual vortexes is allowed to pass without any substantial movements in the direction of a vortex axis (49).

1 Claim, 6 Drawing Sheets

METHOD OF SEQUENTIALLY SEPARATING A MEDIUM INTO DIFFERENT COMPONENTS

This is a continuation of application Ser. No. 883,042, filed on July 11, 1986, now U.S. Pat. No. 4,702,846, which is a continuation of application Ser. No. 689,037, filed on Jan. 8, 1985, now abandoned, which is a continuation of application Ser. No. 469,518, filed on Feb. 24, 1983, now abandoned.

A method of and apparatus for sequentially separating a medium into different components.

The present invention relates to a method of and apparatus for separating a medium into different components by means of centrifugal force in a vortex array, so that part of the vortex flow proceeds from the outer portions of a vortex into the outer portions of a following vortex, and in individual vortexes particles of major mass concentrate in the outer portions of a vortex and those of minor mass concentrate in the inner portions of a vortex.

The term "medium", as used in this specification, is meant to cover powdered and fibrous solid subtances, flowing liquids, liquid drops and gases as well as various mixtures thereof. Similarly, the term "particle" is meant to cover solid particles, liquid drops, liquid molecules, gas molecules and gas atoms. The term "a particle of major mass" is intended to also cover all those particles, which behave in a vortex the same way as a particle of major mass, e.g. as a result of shape, even though in reality there would be no difference in mass or that difference would be opposite.

Prior known are vortex separators of various designs, wherein the vortexes are usually confined by cylindrical or conical surfaces. The wall of a vortex chamber is generally flat and continuous in the travelling direction of a vortex. Most of the prior art vortex separators employ a screw-shaped helical travelling path, often also two concentric screw threads if the question is about a cone. Examples of a sequential vortex array separator are disclosed in U.S. Pat. Nos. 1,660,687, 1,660,685, 3,948,771, 535,099 and 2,701,056. The separating vortexes, which collide with each other, have been disclosed in the Finnish Patent application No. 81337.

A drawback in the prior art vortex separators is a strong frictional resistance, generated between a stationary wall and a fast moving vortex. Such friction creates considerable energy losses and leads to disturbing turbulence near the wall which messes up the separation result already achieved. The frictional resistance is vigorously increased by the helicity of turbulent motion, the particles being forced to circulate a plurality of cycles, the frictional distance adjacent to the wall becoming long. Frictional resistance has been substantially reduced by the solutions set out in the Finnish Patent application No 813387. However, the use of a helix, as shown e.g. in FIG. 16, will only result in a halfway solution with plenty of frictional distance of the wall remaining because of a plurality of cycles.

Due to the strong wall friction, the turbulent motion gradually decelerates and the centrifugal force decreases, leading to the fall of separating power. Therefore, long separator arrays cannot be made successful with prior art technology, when turbulent motion gradually dies away. The most difficult separating tasks would require quite long arrays of vortexes, wherein concentration into different components is effected gradually.

In the prior art vortex arrays the vortexes are not substantially backed up on each other for the reduction of friction. The small slits that are being used are just passages for particles from one vortex to another.

The prior art vortex separator systems are structurally complicated, require a lot of structural material and are inconvenient to manufacture. This is particularly true with conical equipment whose price excessively high considering how simple the apparatus in principle is. The configuration of a system comprising a plurality of apparatus units is generally irregular with a lot of waste space remaining between said units. The equipment cannot always be installed in optimum locations because of the great demand of space.

In conical vortex separators, heavy particles are sought to be separated into the outer portions of a vortex but, due to concentric helixes, the heavy and light components are brought very close to each other since the inner vortex, which contains the light component, makes its turn near the top of a cone. This creates a paradoxical situation, in which the components that are already separated far from each other are nearly combined anew. A result of this is naturally mixing of various components and a poorer final separation.

Most of the prior art vortex separators are provided with a tangential supply duct that is relatively flat with respect to the overall height of the apparatus. Due to the small supply port, the capacity remains small and the apparatus takes a lot of space. The height of a supply port in the prior art equipment is generally about one tenth of the height of an entire apparatus or even a lot smaller than that.

An object of this invention is to alleviate the above drawbacks and that is achieved by applying the method of the invention in a manner that the successive vortexes of an array of vortexes are substantially supported or backed up on each other while rotating in opposite directions and the flow between individual vortexes is allowed to pass without substantial axial movements.

The equipment for carrying out the method of the invention will be described hereinbelow in the appended claims.

The invention can be applied to virtually all separating tasks. Examples include separation of solids from gases, separation of solids from a liquid, assortment and grading of solids particles, thickening and concentrating in general, fractionating of gas mixtures, separation of emulsions etc.

The invention is illustrated by the accompanying figures.

The essential substance of this invention is to simplify and boost the actual separation compared to the prior art centrifugal methods, e.g. cyclones. The primary objective is to reduce friction between vortexes and a wall to eliminate the drawbacks resulting therefrom. In addition, the outer vortex with its heavy components is to be kept as far away as possible from the vortexes' central portions and the light components therein, whereby said components cannot mix with each other. To this end, some of the walls confining the vortexes on their outer periphery are removed. The support action, which urges the vortexes invards and is exerted by the walls, is compensated for by bringing two successive vortexes of an array to back up on each other, the centrifugal forces of said vortexes holding them together. A result of the opposite rotating directions of successive vortexes is that the travelling direction of medium particles is the same where the wall has been removed, thus eliminating the generation of noticeable turbulence. The running speeds of individual vortexes tend to equalize themselves automatically.

A further object of the invention is to reduce the number of required rotations in a vortex, particularly those of the heavy component adjacent to the wall. By providing as simple and quick an exit as possible for the heavy component through the ports between vortexes, it is possible to alleviate abrasion drawbacks and also to reduce friction thereby. By passing a tangential supply or feed into a vortex array over the entire height or almost the entire height of vortexes, it is possible to substantially eliminate the need of axial movements, e.g. the helical paths can be eliminated from the outer portions of vortexes. This is also facilitated by making the heavy fraction discharge or outlet tangential and as high as the vortexes.

Another object of the invention is to intensify centrifugal force in the outer portions of a vortex at the points of sudden reversal of a vortex created in the proximity of removed wall sections. The reason for such reversal points is that the cammon section of successive vortexes tends to build up a flat surface which is a chord for individual vortexes, whereby also the travelling paths become at this point linear, thus creating in the travelling paths of the outer portions of a vortex a shorter than normal radius of rotation prior to and after such point.

The accompanying figures show examples of a few embodiments of the invention and illustrate the way the invention is practiced. In reality, the invention can be practiced by applying a great number of various embodiments. The designs and dimensions of the equipment set out in the invention are chosen according to a given application. The choice can be based on experimental studies and theoretical approach.

Figure 1:
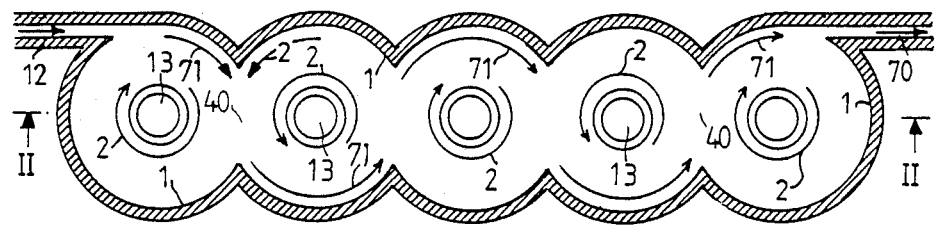
FIG. 1 shows an array of vortexes according to the invention, in which successive vortexes back up on each other and rotate in opposite directions.

The following terms are used for the components illustrated in the figures 1. wall of a vortex chamber
2. general running direction of a vortex
12. a tangential supply duct
13. outlet for a light component
39. a flow divider for separating individual vortexes from each other
40. an area where adjacent vortexes back up on each other
47. lid for a vortex chamber
49. central axis of a vortex
62. heavy component on the bottom of a chamber
63. a flow which by-passes a vortex as illustrated in principle
64. shut-off feeder
65. whirling motion of a scavenging medium in principle
66. supply pipe for a scavenging medium
67. geometric center of a vortex chamber
68. bottom of a vortex chamber
70. outlet for a hevy component
71. travelling path of a heavy component in principle
72. a rounded impact edge
73. average longitudinal axis for an array of vortexes
74. point of sudden change of flow direction.

FIG. 1 shows a vortex array separator, wherein successive vortexes 2 are essentially backed up by each other at points 40. Successive vortex flows 2 travel at such points 40 in a common direction, while the rotating directions are opposite in axial view. A vortex array 2, 2, 2, 2, 2 illustrated in the figure includes five successive vortexes. The general running direction of flow is in the figure from left to right. The supply is effected through a narrow supply duct 12, which covers the height of an entire vortex, thus providing a high capacity. In the first vortex, furthest left in array 2,2 ... , the heavy component tends to work its way to the outer periphery and on into the following vortex 2. The lightest fraction of a light component remains rotating in the first vortex and gradually finds its way to central portions and into outlet 13. In the second vortex 2 of array 2, 2 . . . , the heaviest component tends to continue travelling still on the outer periphery but changing, however, the direction of curvature of motion 71 as compared to the first vortex 2. The heavy component tends to proceed from the second vortex 2 to the right into the third vortex 2 of array 2, 2 . . . , while part of the light component remains rotating in the second vortex 2. The flow 2 rotating in the second vortex collides within a region 40 with the outer portions of said first vortex 2 and by its centrifugal force tends to urge particles of the first vortex towards the center of said first vortex 2. The centrifugal forces of individual vortexes 2 counter-act and vortexes 2 back up on each other within area 40 and retain the whirling motion without the support action of a wall 1. Similar phenomena take place between individual vortexes 2 of a vortex array. If a particle of the heavy component and having a major mass accidentally remains rotating within the light component of one of said vortexes 2, it will return after one cycle to its inlet in vortex 2, whereafter it is very likely to merge into the heavy component during the following cycle. In the array separator illustrated in the figure, the heavy component is all the time kept in individual vortexes 2 in proximity of the outer periphery, while the light component is collected into the central portion of vortexes 2. Due to the distance between them, there is no longer a hazard for different components to mix with each other. The array separator shown in FIG. 1 is linear but such array can also be made arched as well as installed in desired position. The illustrated vortexes 2 are circular but vortex chambers 1 can also have other shapes, e.g. elliptical or even polygonal.

Figure 2:
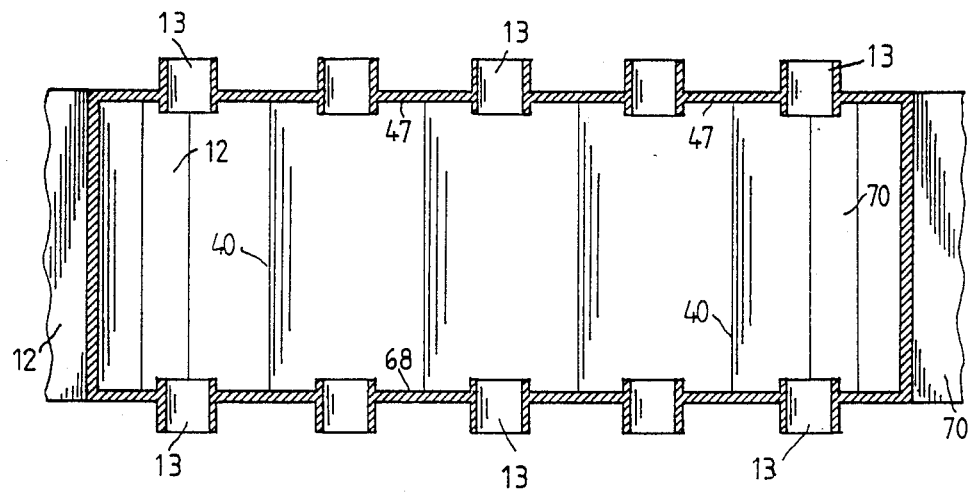
FIG. 2 is a section along line II—II in FIG. 1.

Appearing in the section of FIG. 2 is a flat cover of lid 47 for an array separator as well as a flat bottom 68, both being quite easy to manufacture, if compared e.g. to cones. The light component outlet pipes 13 are in this solution mounted in the middle of each vortex both on lid 47 and bottom 68. If desired, it is possible to use just one-sided discharge for the light fraction. If the light component is discharged bilaterally through pipes 13, the height of an apparatus can be increased for increased capacity. If desired, lid 47 and bottom 68 can be designed to be slightly cup-shaped or ridge-shaped e.g. for increased rigidity. The outlet or discharge pipes 13 of individual vortexes 2 deliver components slightly different from each other in a manner that the lightest component is obtained from the first pipe, slightly heavier component from the second etc., until the heaviest of all is obtained from a discharge duct 70 and the second heaviest from the discharge pipe 13 associated with the last vortex of an array.

Figure 3:
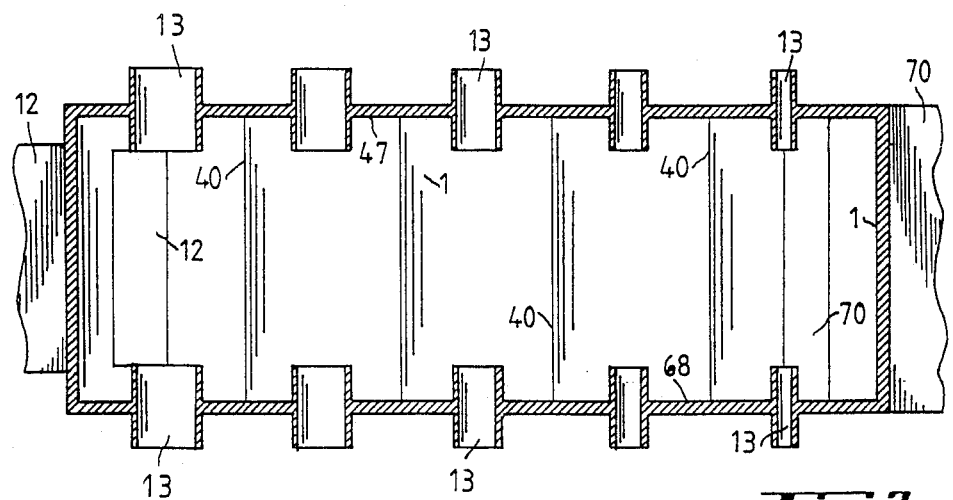
FIG. 3 is an alternative section along line II—II in FIG. 1.

In the section illustrated in FIG. 3, the light component discharge pipes 13 become gradually smaller when proceeding progressively along vortexes 2 of array 2, 2 ... Thus, it is possible to receive approximately equal component from the discharge pipes 13 of individual vortexes 2. The prior effected assortment and concentration are compensated for by the reduced amount to be discharged from the rear end vortexes 2. In the case shown in FIG. 3, the height of a supply duct 12 is the same as the distance between the ends of pipes 13. If similar or equal components are to be taken from pipes 13, such component can be collected in common containers provided e.g. on top of the lid 47 and underneath the bottom 68. The quality of components received from various pipes 13 can also be regulated by valves and counter-pressures, the apparatus thus being readily adaptable to varying conditions.

Figure 4:
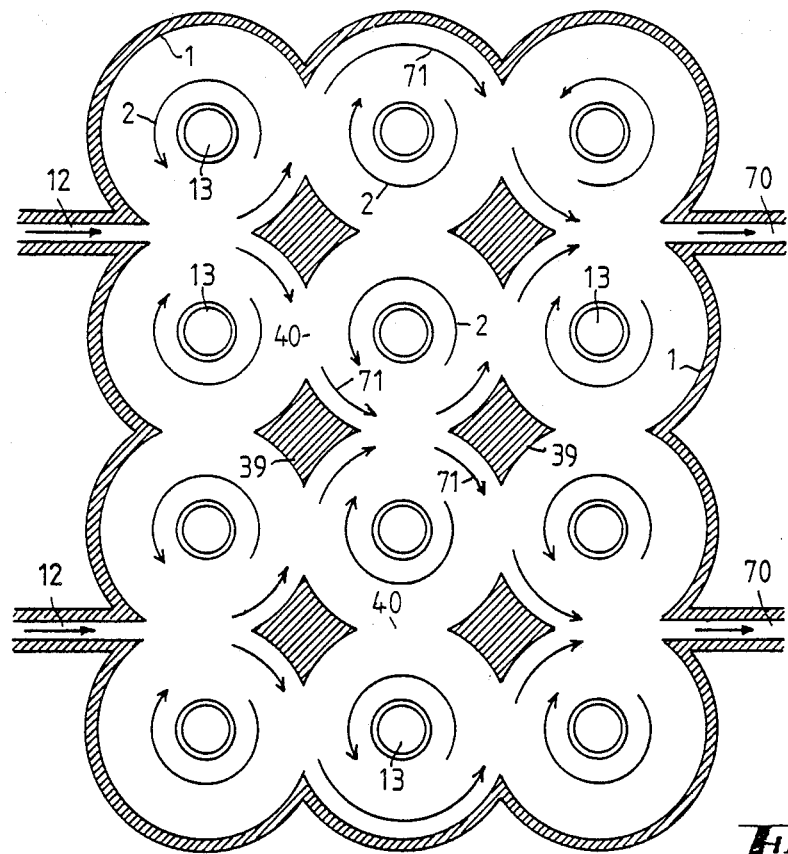
FIG. 4 shows a vortex system, in which four arrays of vortexes of the invention are positioned parallel to and backed up on each other.

FIG. 4 shows four array separators 2, 2, 2 of the invention, connected in parallel relationship and providing a single operative unit. By backing up vortexes 2 also laterally on other vortexes 2, it has been possible to even further reduce the share of a scrubbing wall 1 as well as that of structural material. The consumption of energy and abrasion drawbacks are reduced. A large number of vortexes 2 can be fitted in a small box-like space with no useless intermediate spaces. Flow dividers 39 cut a narrow supply or feed flow from ducts 12 further into two arrays, the feed received by each array 2, 2 ... being very narrow. Thus, the cross-travelling possibility of the light and heavy component particles in desired directions from different edges of the feed is facilitated. The supply duct 12 can be widened, so that even a small apparatus produces high capacity. For various applications the width of a supply duct 12 can be made adjustable.

Figure 5:
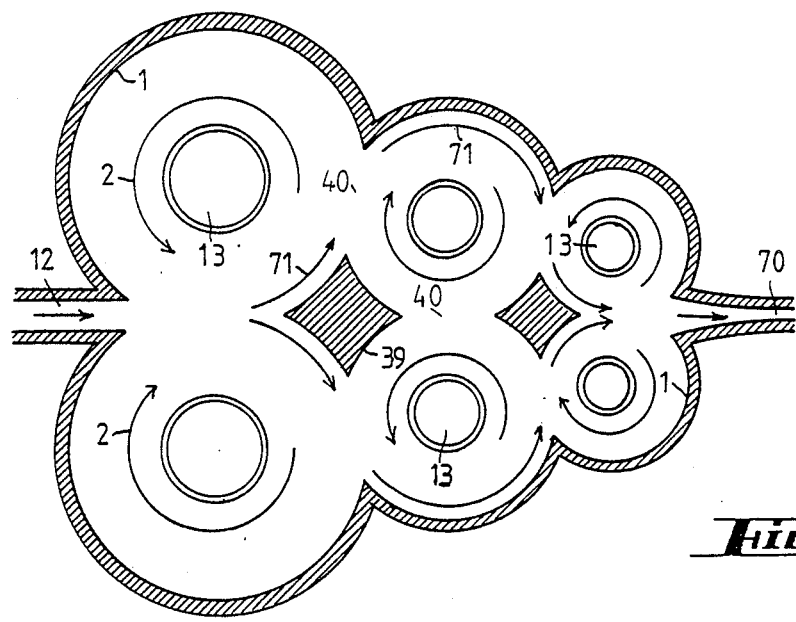
FIG. 5 shows a system consisting of two arrays of vortexes of the invention, with the vortexes going smaller in diameter.

FIG. 5 shows a solution in which the diameter of vortexes diminishes when advancing in a vortex array 2, 2 ... Thus, a well concentrated heavy component will be obtained from the rear end. If desired, vortexes can also be made so that the diameters thereof grow progressively. The performance characteristics of the apparatus can also be adjusted by modifying the width of area 40. This can be effected e.g. by replacing flow dividers 39.

Figure 6:
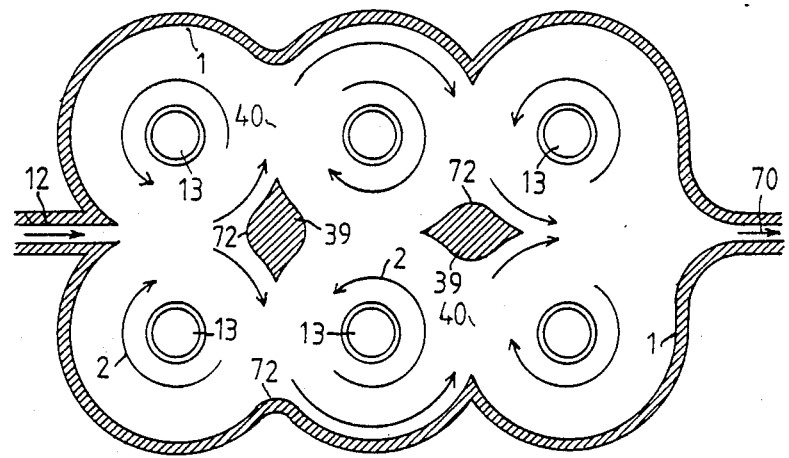
FIG. 6 shows a system consisting of two arrays of vortexes of the invention, in which the impact edges against the flow are rounded.

FIG. 6 illustrates a system provided by two vortex arrays and intended for the treatment of long filamentous particles. To avoid adherence to the impact edge, the apparatus is provided with rounded impact members 72.

Figure 7:
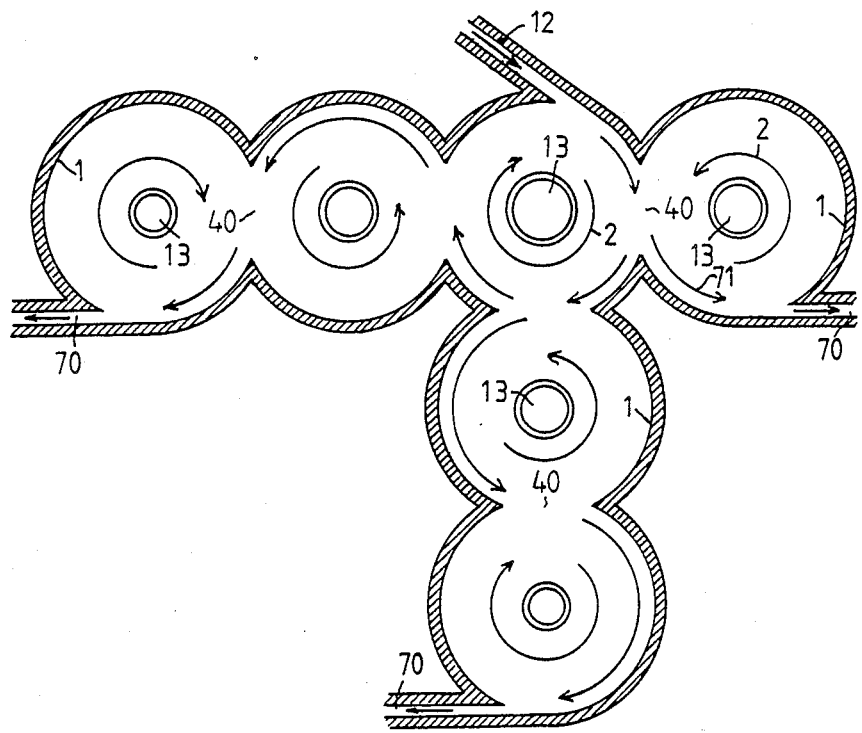
FIG. 7 shows arrays of vortexes of the invention which branch in three directions from a single supply vortex.

In the case illustrated in FIG. 7, one vortex 2 serves as a distributor means from which the flow is distributed into three individual vortex arrays. Individual arrays receive different components according to the order such arrays meet the flow emerging from a supply duct 12. The heaviest component will be forced to go into the first branch and the lightest into the last. If desired, the number of branches can be increased to more than three.

Figure 8:
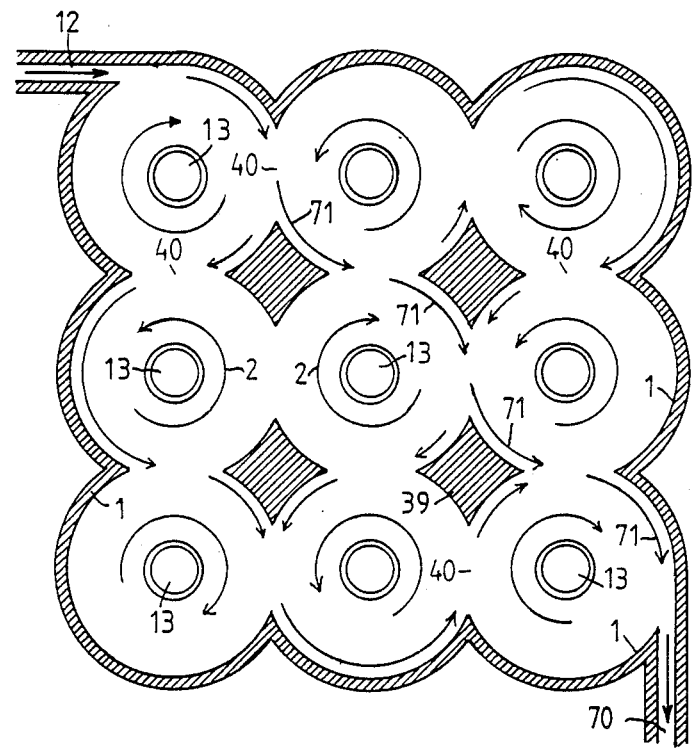
FIG. 8 shows arrays of vortexes of the invention, comprising several branchings and conjunctions.

In the case shown in FIG. 8, a flow emerging from a single supply duct 12 is branched into 3×3 vortexes. Various components find their most natural passages. The heaviest component for example, tends to work its way nearly linearly 7, towards its own outlet. The discharge pipes of individual vortexes may deliver various components. The quality of various components received from various pipes 13 can be regulated by means of pipe sizes and counter-pressures. In the solution shown in the figure, a light fraction discharges from nine defferent vortexes through pipes 13, the radial flow rate in individual vortexes remaining very low. Thus, it is possible to separate very small particles indeed, when the residence time in vortexes is long. The essential reduction of frictional resistance with respect to traditional helical movement solutions facilitates the building of very extensive systems, as the whirl motion can be maintained for a long time. In the solution set forth in FIG. 8, individual vortex arrays are branched and united many times.

Figure 9:
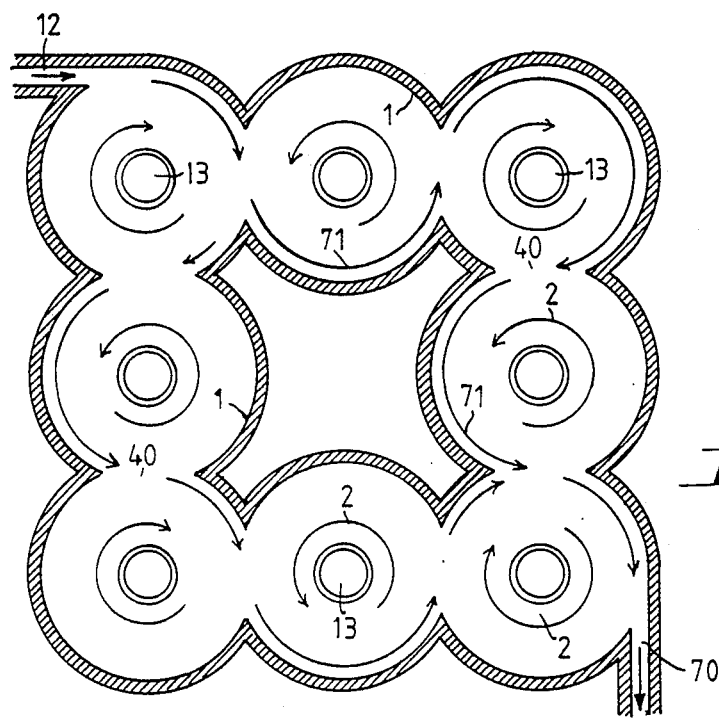
FIG. 9 shows two arrays of vortexes of the invention which branch and re-unite.

In a solution displayed in FIG. 9, two vortex arrays 2, 2 ... are branched from a single supply point and finally united, so that the heaviest component can be collected from both branches in a single discharge duct 70.

Figure 10:
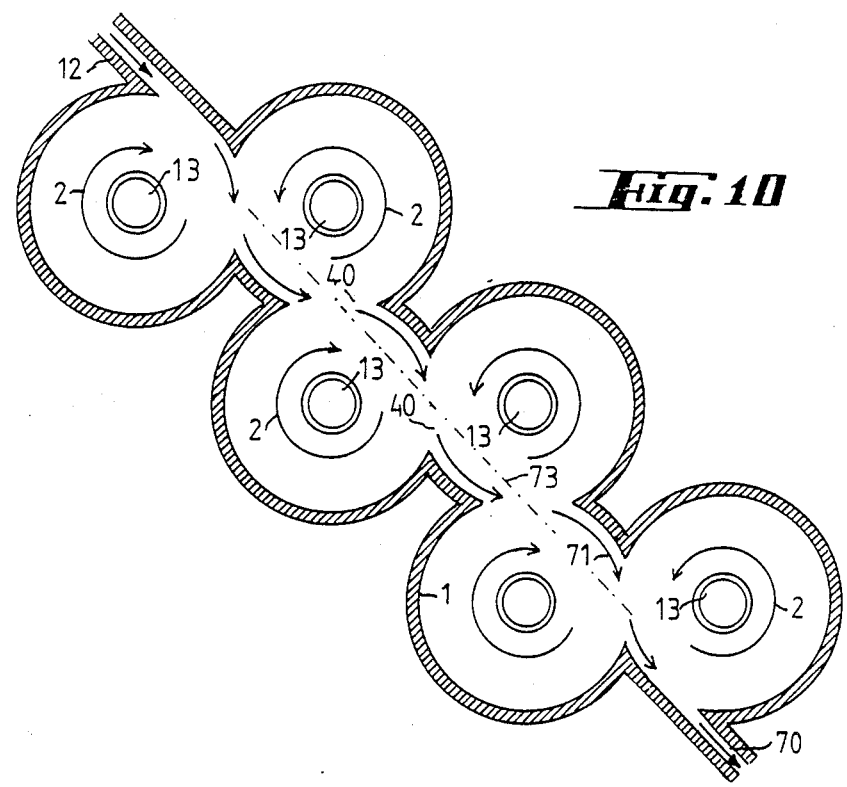
FIG. 10 shows an array of vortexes of the invention with the vortexes alternately disposed on either side of the average longitudial axis of an array.

In a solution shown in FIG. 10, the successive vortexes of a vortex array 2, 2 ... are alternately disposed on either side of the average longitudinal axis 73. This provides for the heaviest component a relatively linear route through the apparatus, thus alleviating the abrasion problems.

Figure 11:
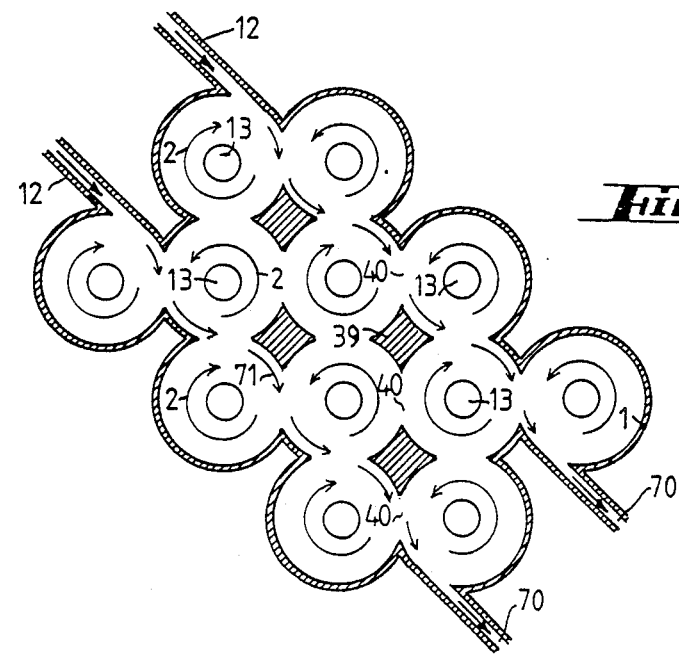
FIG. 11 shows a vortex system with two vortex arrays of FIG. 10 combined in parallel relationship.

In FIG. 11, there are joined in parallel relationship two vortex arrays 2, 2 ... of FIG. 10, resulting in the reduction of wall surface. Even more extensive systems can be made.

Figure 12:
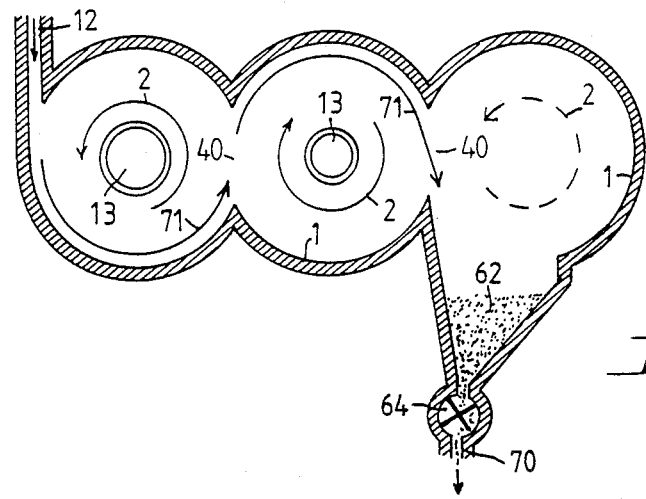
FIG. 12 shows an array of vortexes of the invention, in which the last vortex is not fitted with outlet for a light component.

In FIG. 12, the last vortex is not at all provided with a light component discharge pipe 13, whereby the last vortex can be designed as a closed collection container for the heavy component. Said heavy component can be discharged e.g. periodically through a shut-off feeder 64. Since the last vortex chamber is closed, it receives no actual in-flow but only particles of the heaviest component fly in as a result of their centrifugal force. The passage of fine component into and within coarse component is prevented this way. At the interface between the last vortex and the preceding one there is like an invisible wall for the light component.

Figure 13:
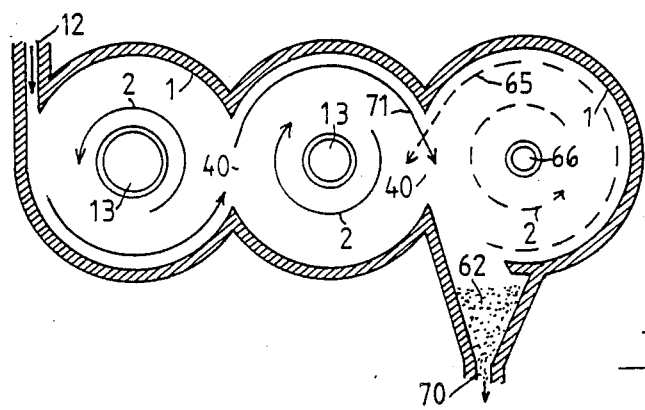
FIG. 13 shows an array of vortexes of the invention, in which the last vortex is fed with a scavenging medium.

In FIG. 13, the action described in connection with FIG. 12 has been intensified by passing into the last vortex chamber 1 some scavenging medium, which flows through a vortex back-up zone 40 slowly into the preceding vortex 2, rinsing therealong the light particles mixed with the heavy component. The flow of a scavenging medium 65 runs crosswise relative to passage 71 of the heavy component.

Figure 14:
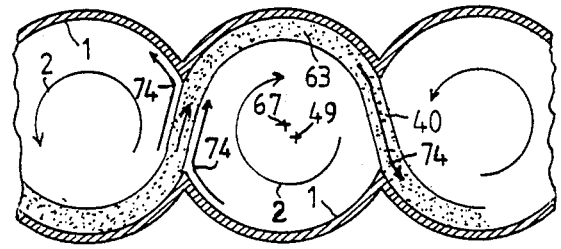
FIG. 14 shows in principle the deviation of a vortex center from the geometric center of a vortex chamber.

FIG. 14 shows in principle the deviation between the real center 49 of a vortex and the geometric center 67 of a vortex chamber. The flow 63 which by-passes vortex 2 urges the vortex center 49 away from itself and the force of a flow entering said vortex 2 displaces the vortex center slightly also in the advance direction of a vortex array 2, 2 . . . In the preceding figures this deviation has not been illustrated but, in practical constructions, the discharge pipes 13 should be positioned in the real vortex center 49. Its position can be determined experimentally.

I claim:

1. A method of sequentially separating a medium into different components by means of centrifugal force, comprising steps of:

forming a first array of at least three successive separating vortexes alternately rotating in opposite flow directions between at least one initial vortex and at least one terminal vortex at spaced-apart at least one entry and at least one discharge ends of the first array, the at least one initial vortexes each being different from the at least one terminal vortexes, with each having a center and defining center lines between adjacent pairs of vortexes, and with each having radially central and radially outer vortex portions such that particles having a comparatively larger mass concentrate in the outer portion of a vortex and those having a comparatively smaller mass concentrate in the inner portion of a vortex;

partially overlapping the at least three successive separating vortexes of the vortex array to substantially back up adjacent separating vortexes on each other in corresponding interfaces both upstream and downstream relative to the corresponding center lines and flow directions and to allow downstream flow of the comparatively larger mass particles between individual adjacent vortexes to run from the outer portion of one vortex into the outer portion of its succeeding vortex without any substantial axial movement and in such a way that the flow area and the backup interfaces of the partially overlapping successive separating vortexes is substantially smaller than the flow area of the successive separating vortexes elsewhere;

feeding a medium having different components to be separated including the comparatively larger mass particles into said initial ones of the successive separating vortexes at said at least one entry end of said first array the comparatively larger mass particles being fed therefrom into one or more of vortexes intermediate the initial and terminal vortexes of the first array of at least three successive separating vortexes, and from there, said particles being further fed into said terminal vortexes for removal; and separately removing the different components from said first array after separation including removing the comparatively larger mass particles from said terminal ones of the successive separating vortexes of said at least one discharge end thereof.

* * * * *